(12) United States Patent
Danto et al.

(10) Patent No.: US 10,221,088 B2
(45) Date of Patent: Mar. 5, 2019

(54) RIBBON OPTICAL FIBER MADE OF PHOTOSENSITIVE GLASS

(71) Applicants: CENTRE NATIONAL DE LA RECHERCHE SCIENTIFIQUE (CNRS), Paris (FR); Université de Bourgogne, Dijon (FR); Université de Bordeaux, Bordeaux (FR)

(72) Inventors: Sylvain Danto, Bordeaux (FR); Thierry Cardinal, Salles (FR); Yannick Petit, Begles (FR); Lionel Canioni, Gradignan (FR); Frédéric Desevedavy, Dijon (FR); Frédéric Smektala, Remilly sur Tille (FR)

(73) Assignees: CENTRE NATIONAL DE LA RECHERCHE SCIENTIFIQUE (CNRS), Paris (FR); Université de Bourgogne, Dijon (FR); Université de Bordeaux, Bordeaux (FR)

( * ) Notice: Subject to any disclaimer, the term of this patent is extended or adjusted under 35 U.S.C. 154(b) by 0 days.

(21) Appl. No.: 15/574,354

(22) PCT Filed: May 12, 2016

(86) PCT No.: PCT/EP2016/060642
§ 371 (c)(1),
(2) Date: Aug. 23, 2018

(87) PCT Pub. No.: WO2016/184770
PCT Pub. Date: Nov. 24, 2016

(65) Prior Publication Data
US 2018/0370842 A1    Dec. 27, 2018

(30) Foreign Application Priority Data

May 15, 2015 (FR) .................................... 15 54379

(51) Int. Cl.
*G02B 6/44* (2006.01)
*C03B 37/027* (2006.01)
(Continued)

(52) U.S. Cl.
CPC ............ *C03B 37/027* (2013.01); *G01T 1/201* (2013.01); *G02B 6/02114* (2013.01);
(Continued)

(58) Field of Classification Search
None
See application file for complete search history.

(56) References Cited

U.S. PATENT DOCUMENTS

2006/0141181 A1    6/2006 Langsdorf et al.
2016/0349447 A1*  12/2016 Butler ................ G02B 6/02042

FOREIGN PATENT DOCUMENTS

KR    2012 0006173 A    1/2012
WO    2015/037981 A2    3/2015

OTHER PUBLICATIONS

International Search Report issued in corresponding application No. PCT/EP2016/060642 dated Aug. 24, 2016 (4 pages).
(Continued)

*Primary Examiner* — Jerry Rahll
(74) *Attorney, Agent, or Firm* — Osha Liang LLP (57) ABSTRACT

Optical fiber (1) made of a photosensitive glass and with a rectangular cross section, wherein the radius of curvature of a corner of the rectangular cross section is smaller than 100 microns.

17 Claims, 7 Drawing Sheets

(51) Int. Cl.
 *G01T 1/20* (2006.01)
 *G02B 6/02* (2006.01)
(52) U.S. Cl.
 CPC .......... *G02B 6/4403* (2013.01); *G02B 6/448* (2013.01); *C03B 2203/04* (2013.01); *C03B 2205/08* (2013.01)

(56) References Cited

OTHER PUBLICATIONS

Written Opinion of the International Searching Authority issued in corresponding application No. PCT/EP2016/060642 dated Aug. 24, 2016 (7 pages).

\* cited by examiner

RIBBON OPTICAL FIBER MADE OF PHOTOSENSITIVE GLASS

TECHNICAL FIELD

The present description relates to a ribbon optical fiber made of a photosensitive glass and to a process of manufacturing a ribbon optical fiber made of photosensitive glass.

PRIOR ART

The takeoff of photonics with applications in the sectors of health, energy, security, defense or of telecommunications generates new technological challenges in terms of the nano/micro-/millimeter structuration of materials. The drawing of photonic and/or hybrid structures allows the multiscale structuration of complex systems with innovative functionalities.

The prior art teaches the manufacture and the use of bulk glasses such as bulk glasses made of silver phosphates for applications of photosensitizing. In the fiber form, the geometry of the known optical glass fibers has long been reduced to cylindrical shapes due to the minimization of the surface energy.

The prior art also teaches flat optical glass fibers for use in dosimetry. The prior art also teaches the technique of a process for the manufacture of such optical fibers of flat glass. This known process consists of collapsing a hole or air inside the glass by applying a vacuum source during the heating and of drawing a glass preform of silica in the form of a hollow tube. In general, according to this known process an optical fiber of flat glass is obtained with an ovoidal shape resulting from the flattening of the glass preform in the form of a hollow tube. Therefore, this process is uniquely suited for the manufacture of optical fibers of flattened glass with an ovoidal shape. This prior technology is especially illustrated, for example, as reported in the international publication No. 2015/037981.

Nevertheless, an optical fiber or flat glass continues to be difficult to use in photosensitizing and in particular in photo-writing. In particular, an optical fiber of known flat glass comprises defects such as (i) extremely curved extremities related to the manufacturing process by aspiration and (ii) air holes inside of it which can cause pollutions and/or degradations of the state of the glass surface such as the formation of passivating layers inside the flattened glass.

SUMMARY OF THE INVENTION

One subject matter of the present description is to remedy the above-mentioned deficiencies and to supply a ribbon optical fiber of photosensitive glass, in particular for application in photonics, in dosimetry, for the generation of Bragg gratings and/or in photo-writing such as in direct laser writing of patterns such as lines, curves or tubes on optical fiber, optionally of nanometric structures, optionally of hybrid structures, optionally with nonlinear and/or plasmonic effects. Another subject matter of the present application is to provide a simple, rapid and less expensive process which allows the obtaining of a flexible ribbon optical fiber made of photosensitive glass, with an arbitrary length, width and thickness.

According to a first aspect, the present description concerns an optical fiber made of a photosensitive glass and with a rectangular cross section in which the radius of curvature of an angle of the rectangular cross-section is comprised between 1 and 100 μm.

The optical fiber described in this manner allows an use in photosensitization and especially in photo-writing. In particular, the optical fiber described in this manner comprises plane surfaces. Therefore, the optical fiber does not have strongly curved ends. Moreover, the optical fiber described in this manner does not have a noticeable variation of its composition or of airholes inside it which can cause pollution, oxidation or crystallization of the glass.

According to an embodiment, the radius of curvature of an angle of the rectangular cross section is comprised between 1 and 50 micrometers. According to a preferred embodiment the radius of curvature of an angle of the rectangular cross section is comprised between 1 and 30 micrometers. According to a preferred embodiment the radius of curvature of an angle of the rectangular cross section is comprised between 1 and 20 micrometers. According to a preferred embodiment the radius of curvature of an angle of the rectangular cross section is comprised between 1 and 10 micrometers.

According to an embodiment, the radius of curvature of an angle of the rectangular cross section is less than one fourth of the average width of the rectangular cross section and/or than one half of the average thickness of the rectangular cross section. According to an embodiment the radius of curvature of an angle of the rectangular cross section is less than one eighth of the average width of the rectangular cross section and/or than one fourth of the average thickness of the rectangular cross section. According to an embodiment, the radius of curvature of an angle of the rectangular cross section is less than one twelfth of the average width of the rectangular cross section and/or than one sixth of the average thickness of the rectangular cross section. According to an embodiment, the radius of curvature of an angle of the rectangular cross section is less than one sixteenth of the average width of the rectangular cross section and/or than one eighth of the average thickness of the rectangular cross section.

According to an embodiment, the optical fiber of photosensitive glass with a rectangular cross section is free of passivating layers inside it.

According to an embodiment, the photosensitive glass is photosensitive and photo-writable. In fact, the optical fiber described in this manner allows the manufacture of luminescent structures in 2 or 3 dimensions with spatial resolutions which can be below 100 nm. Aside from the luminescence, signals of the generation of third harmonics and of second harmonics can be observed on the edges of the written structures.

According to an embodiment the photosensitive glass is selected from the group constituted by phosphate, tellurium, chalcogenide, borate and silica glasses.

According to a preferred embodiment the photosensitive glass is a glass made of phosphates. According to an embodiment the photosensitive glass is a glass of phosphate-zinc. According to an embodiment the photosensitive glass is a glass made of phosphate-zinc-sodium. According to an embodiment the photosensitive glass is a glass made of fluorophosphates. The glasses made of phosphates advantageously have vitreous transition temperatures ($T_g$: 200-400° C., compared to $T_{g\ silica}$: 1200° C.) and of drawing ($T_{fiber}$: 500-600° C., compared to $T_{fiber\ silica}$: 2000° C.) much less than those of silica.

According to an embodiment the photosensitive glass is a doped glass, optionally intrinsically or extrinsically. According to a preferred embodiment the photosensitive glass is a glass doped intrinsically. According to an embodiment the photosensitive glass is a glass doped with silver, germanium or boron. According to a preferred embodiment the photosensitive glass is a glass doped with silver, in particular in a homogeneous and disperse manner, wherein the silver is an example of doping agent which allows the photo-writing of the photosensitive glass.

The optical fiber described in this manner allows the doping of a large number of silver ions without the formation of aggregates (i.e., clusters), therefore preserving the need for a doping with germanium (intrinsic photosensitivity) or with a charge of hydrogen (extrinsic photosensitivity).

According to an embodiment the rectangular cross section forms a cladding comprising at least one core and/or an organized assembly of holes, optionally with a cylindrical shape. According to a preferred embodiment the core is a vitreous core. According to a preferred embodiment the core is a doped photosensitive glass.

According to an embodiment the rectangular cross section has an average width comprised between 100 and 400 micrometers and/or an average thickness comprised between 50 and 200 micrometers. According to an embodiment the rectangular cross section has an average width comprised between 150 and 300 micrometers and/or an average thickness comprised between 75 and 150 micrometers.

According to a second aspect the present description relates to a process for manufacturing an optical fiber of photosensitive glass with the rectangular cross section, which process comprises the steps of: providing a preform of photosensitive glass with a rectangular cross-section, and homothetic drawing of the preform.

The process described in this manner allows optical fibers of photosensitive glass with the rectangular cross-section according to the first aspect to be obtained in a simple, rapid manner and with less expensive cost. Furthermore, this process is adapted to the laser inscription at any stage of the manufacturing process of the optical fiber, whether it is pre-drawing (on the preform), in line (during the drawing of the fiber) or post-drawing (on the fiber).

According to an embodiment the homothetic drawing of the preform comprises the heating of the preform and the placing of the heated preform under mechanical tension.

According to an embodiment of the heating temperature of the preform is comprised between 200 and 2100° C.

According to an embodiment the heating temperature of the preform is comprised between 500 and 800° C. According to embodiment the heating temperature of the preform is comprised between 600 and 750° C. According to an embodiment the heating temperature of the preform is comprised between 650 and 730° C. According to an embodiment the heating temperature of the preform is comprised between 680 and 720° C. These embodiments are particularly adapted to the homothetic drawing of a preform of glass made of phosphates.

According to an embodiment the heating temperature of the preform is comprised between 400 and 700° C. According to an embodiment the heating temperature of the preform is comprised between 500 and 650° C. According to an embodiment the heating temperature of the preform is comprised between 550 and 630° C. According to an embodiment the heating temperature of the preform is comprised between 580 and 620° C. These embodiments are particularly adapted to the homothetic drawing of a preform of glass made of telluriums.

According to an embodiment the heating temperature of the preform is comprised between 200 and 500° C. According to an embodiment the heating temperature of the preform is comprised between 300 and 450° C. According to an embodiment the heating temperature of the preform is comprised between 350 and 430° C. According to an embodiment the heating temperature of the preform is comprised between 380 and 420° C. These embodiments are particularly adapted to the homothetic drawing of a preform of glass made of chalcogenides.

According to an embodiment the heating temperature of the preform is comprised between 800 and 1100° C. According to an embodiment the heating temperature of the preform is comprised between 900 and 1050° C. According to an embodiment the heating temperature of the preform is comprised between 950 and 1030° C. According to an embodiment the heating temperature of the preform is comprised between 980 and 1020° C. These embodiments are particularly adapted to the homothetic drawing of a preform of glass made of borates.

According to an embodiment the heating temperature of the preform is comprised between 1800 and 2100° C. According to an embodiment the heating temperature of the preform is comprised between 1900 and 2050° C. According to an embodiment the heating temperature of the preform is comprised between 1950 and 2030° C. According to an embodiment the heating temperature of the preform is comprised between 1980 and 2020° C. These embodiments are particularly adapted to the homothetic drawing of a preform of glass made of silicas.

According to a preferred embodiment, a rate of descent of the preform is comprised between 0.3 and 0.7 mm/min. According to a preferred embodiment, a rate of descent of the preform is comprised between 0.4 and 0.6 mm/min. According to a preferred embodiment, a rate of descent of the preform is comprised between 0.45 and 0.55 mm/min.

According to an embodiment the tension of the heated preform is comprised between $2 \cdot 10^{-2}$ and $40 \cdot 10^{-2}$ newtons. According to a preferred embodiment the tension of the heated preform is comprised between $10 \cdot 10^{-2}$ and $30 \cdot 10^{-2}$ newtons. According to a preferred embodiment the tension of the heated preform is comprised between $15 \cdot 10^{-2}$ and $25 \cdot 10^{-2}$ newtons.

According to an embodiment the heating temperature of the preform is comprised between 500 and 800° C., a rate of descent of the preform is comprised between 0.3 and 0.7 mm/min, and the tension of the heated preform is comprised between $2 \cdot 10^{-2}$ and $40 \cdot 10^{-2}$ newtons.

According to an embodiment the process furthermore comprises the polishing of the preform and the homothetic drawing of the polished preform. According to an embodiment the polishing is carried out until obtaining a polished preform with an average grain size lower than 5 μm. The optical fiber described in this manner allows the elimination of defects in the surface of the optical fiber and also allows a high-quality laser inscription.

According to an embodiment the process furthermore comprises the piercing of at least one hole in the preform. According to an embodiment the process furthermore comprises the insertion of a cylinder or of a vitreous tube into at least one hole pierced in the preform.

According to an embodiment the homothetic drawing is carried out under inert or oxidizing atmosphere, optionally at atmospheric pressure. According to an embodiment the homothetic drawing is carried out under a flow of oxygen or of helium.

According to a third aspect the present description relates to a usage of an optical fiber according to the first aspect or of an optical fiber obtained by the process according to the second aspect for being used in laser photo-writing, photonics, dosimetry, generation of Bragg gratings and in linear and/or non-linear optics.

According to a fourth aspect the present description relates to an optical device comprising an optical fiber according to the first aspect or to an optical fiber obtained by the process according to the second aspect.

According to an embodiment the optical device is selected from the group constituted by a dosimetric fiber, and optical telecommunication system, a mirror forming an optical cavity of a fiber laser or of a narrow-band sensor, a laser diode and a fiber sensor.

According to an embodiment the dosimetric fiber is an opto-scintillating fiber. According to an embodiment the optical device is a 2D grill of dosimetric fibers. According to an embodiment the optical device is an optical device based on Bragg gratings.

According to an embodiment the optical telecommunication system is a wavelength-selective filter, a multiplexer or a demultiplexer.

According to an embodiment the filter sensor is a detector of chemical products, of mechanical stress, of vibrations, of acceleration or of temperature.

DETAILED DESCRIPTION

In the sense of the present description "ribbon optical fiber" denotes an optical fiber with a rectangular cross section; "rectangular cross section" denotes a quadrilateral cross section whose angles are comprised between 85° and 95°; "photosensitive" denotes the capacity of the glass to modify at least one of its properties by the receiving of energetic particles (photons, electrons, gamma rays, x-rays, etc.); "width" and "thickness" of the rectangular cross section denote the length of the longest two sides and the length of the shortest two sides of the rectangular cross section respectively.

Figure 1:
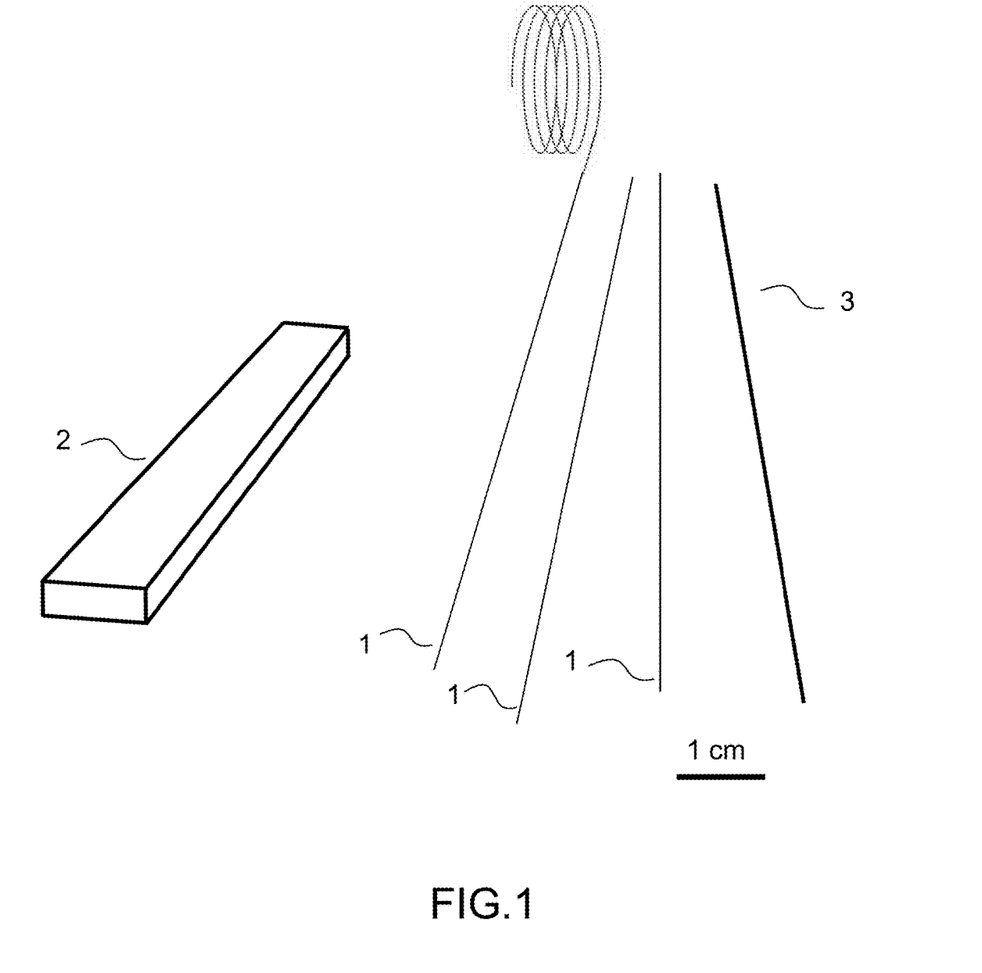
FIG. 1 schematically shows an isometric view according to an embodiment of optical fibers made of a photosensitive glass with a rectangular cross section, of a preform of photosensitive glass with a rectangular cross section, and of a preform of photosensitive glass with a rectangular cross section after being homothetically drawn.
Figure 2:
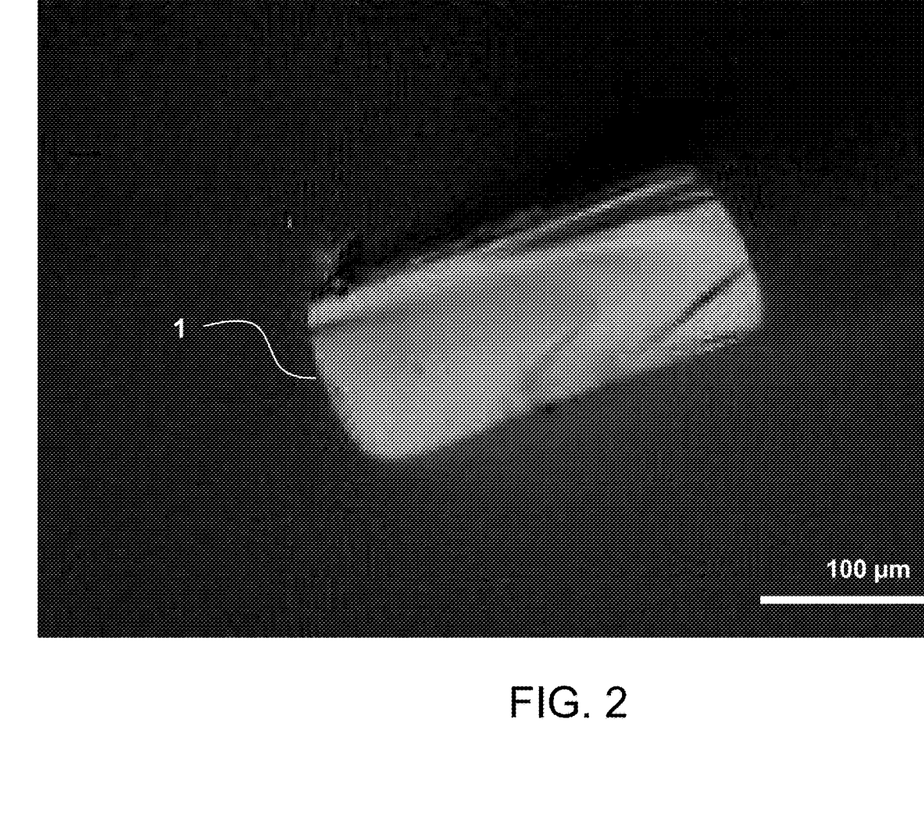
FIG. 2 shows am image of a sectional view of an optical fiber of photosensitive glass with a rectangular cross section according to an embodiment.

An example of optical fiber 1 made of a photosensitive glass with a rectangular cross section according to the first one is schematically shown in FIG. 1. The optical fiber 1 is shown along with a preform 2 made of a photosensitive glass with a rectangular cross section used by the manufacturing process of the optical fiber 1, and of a capillary 3 made of a photosensitive glass with a rectangular cross section which can be manufactured according to the same manufacturing process. FIG. 2 shows an image by scanning electronic microscopy (SEM) of a sectional view of an example of optical fiber 1 made of a photosensitive glass with a rectangular cross section. This optical fiber 1 has the particularity of comprising a radius of curvature of an angle of the rectangular cross section comprised between 1 and 100 micrometers. This ribbon optical fiber 1 also has the particularity of being able to be obtained by the homothetic drawing of the preform 2 made of a photosensitive glass with a rectangular cross section. In fact, during the homothetic drawing of the preform 2 made of a photosensitive glass with a rectangular cross section, the size of the preform 2 can be therefore reduced in a homothetic manner to that of a capillary 3 and/or of a target ribbon optical fiber 1.

Figure 3:
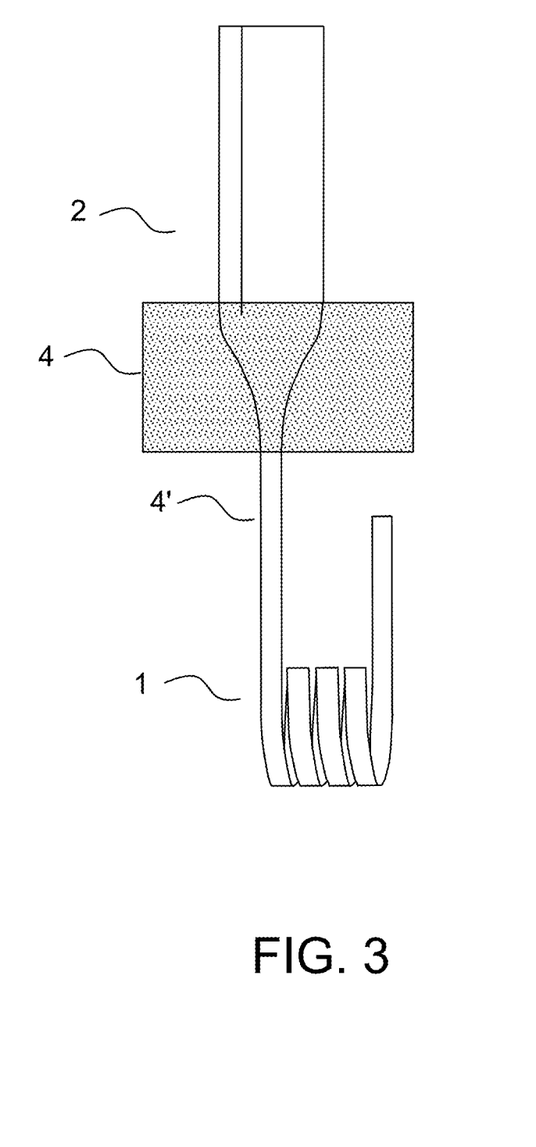
FIG. 3 schematically shows a homothetic drawing of a preform according to an embodiment.

FIG. 3 shows in a schematic manner an example of a manufacturing process of an optical fiber 1 made of a photosensitive glass with a rectangular cross section according to the second aspect. The process comprises providing a preform 2 made of a photosensitive glass with a rectangular cross section, and the homothetic drawing of the preform 2, especially by the heating 4 of the preform 2 and the placing of the preform 2 heated in this manner under mechanical tension 4'. For example, the preform 2 can have a width of 10 mm, a thickness of 5 mm and a length of 80 mm. The preform 2 is then reduced in a thermal manner into several dozen meters of a mechanically flexible optical fiber 1 according to the first aspect.

By way of example, ribbon optical fibers 1 made of photosensitive phosphate glasses doped with silver were manufactured. Phosphate glass preforms 2 were selected for their thermal-mechanical and chemical stability, their excellent optical properties (e.g. transmission in infrared, fluorescence, non-linearity), and their ability to form matrices favorable to the direct structuration induced by femtosecond laser of non-linear photo-luminescent patterns, in particular by the dispersant homogeneous doping of silver ions. For example, the interaction of silver ions with a femtosecond laser with a high repetition rate allows the formation of aggregates of silver distributed locally and having properties of fluorescence and non-linear optical properties of the 2nd order.

Providing the Preform

The photosensitive glass selected for the examples is a glass of phosphate-zinc-sodium doped with silver (composition: $40P_2O_5\text{-}55ZnO\text{-}1Ga_2O_3\text{-}2Na_2O\text{-}2Ag_2O$ (mol %); $T_g=385°$ C. [±2° C.]; $\rho=3.30$ [±0.01 g·cm$^{-3}$]; n (639 nm)=1.57 [±0.01] hereinafter: PZG-2N2A). This glass has a band-gap wavelength of 280 nm (linked to the absorption band of the Ag$^+$ ions around 260 nm). When this glass is excited at 260 nm, the Ag$^+$ ions distributed in a homogeneous manner in the matrix bring about an intrinsic emission of fluorescence centered essentially around 365 nm. This glass was synthesized according to a standard technique of rapid quench of the molten state. Specifically, precursor powders (ZnO, Ga$_2$O$_3$, NaPO$_3$, AgNO$_3$, Na$_2$O), preferably with a high purity, are weighed and mixed in a platinum crucible. The mixture is heated until reaching a temperature of 1100° C. at a rate of 1° C. per minute, then the mixture is maintained at the temperature of 1100° C. for 12 hours. This liquid mixture is then poured into a copper plate in order to freeze the molten mass and obtain photosensitive glasses of PZG-2N2A. The photosensitive glasses are then molded in the form of preforms 2 of photosensitive glass with a rectangular cross section by pouring them into molds or plates of copper or brass preferably preheated to a temperature of $T_g$–10° C., especially at 375° C. The entirety is then reheated at a temperature of $T_g$–40° C. for 12 hours.

Drawing of the Preform

In the examples the homothetic drawing is performed by using a 3-meters high drawing tower dedicated to realizing optical fibers, comprising a preform holder, an annular electrical furnace, a diameter controller, a tension regulator and a collection drum. The preform 2 made of a photosensitive glass with a rectangular cross section is slowly introduced into the furnace and the temperature is progressively raised, especially at a rate of 10° C. per minute until having reached approximately 700° C., optionally under a continuous current of oxygen or gaseous helium (0.5 liter per minute in this example) in order to minimize the reduction, the diffusion and the aggregation of the $Ag^+$ ions. The movement of the preform holder and the rate of the rotation of the collector drum are controlled, preferably in real time, in order to produce a target size of the ribbon optical fiber 1. In the examples the rate of the descent of the preform is 0.5 mm/min and the tension is 10 g. Following this procedure, several dozens of meters of ribbon optical fiber 1 made of a photosensitive glass are produced, wherein the ribbon optical fibers 1 have average widths of their rectangular cross section ranging from 75 micrometers to 250 micrometers.

The ratio between the length and the width of the ribbon optical fiber 1 can be advantageously selected at the manufacture of the preform. The average length and the average width of the ribbon optical fiber 1 can be advantageously selected during the stages of the homothetic drawing of the preform 2, for example, as a function of the tension applied to the preform during the drawing. The average sizes can be calculated after the drawing or in real time by the diameter controller.

Physical Characteristics of the Ribbon Optical Fiber

Advantageously, the luminescent properties of the preforms 2 are retained during the course of the process of shaping the ribbon optical fibers 1. Furthermore, the planar geometry of the ribbon optical fiber 1 made of a photosensitive glass is adapted to the laser inscription of nanometric, complex and varied luminescent patterns (e.g., tubes, lines, spirals, etc.) on the surface or inside the fiber (e.g., at 50 micrometers below the surface), in particular by virtue of the formation of silver aggregates within the glass matrix.

Advantageously, no signs of heterogeneity or of inclusion were noticed in the ribbon optical fiber 1 made of a photosensitive glass. Therefore, the optical transparency of the ribbon optical fiber 1 made of a photosensitive glass in the near infrared was confirmed by a study of the losses of fiber at 1064 nm and 1550 nm.

Finally, A Raman spectroscopic study made on samples of fibers (1) and preforms 2 of PZG-2N2A showed an exact overlapping of the normalized Raman signatures (two wide bands at 705 nm for the symmetric drawing P—O—P and at 1175 $cm^{-1}$ for the symmetric drawing of $PO_2$ in the tetrahedral units of $PØ_2O_2^-$ where Ø is a bridging oxygen), therefore demonstrating no structural difference during the process of homothetic drawing.

Laser Inscription

The strong intensity and the short impulses of the femtosecond lasers allow the non-thermal deposition of energy inside the materials with a spatial resolution of the order of the wavelength by interactions of non-linear type. The photosensitive glasses, in particular made of phosphates, proved to be excellent materials for the inscription of local properties of luminescence or of non-linear optics. In fact, the laser inscription of ribbon optical fibers 1 of the present description leads to numerous applications such as the direct inscription on wave guide fiber or also of nanostructures with non-linear and/or plasmonic effects.

The process of laser inscription can be described as a multi-photon absorption leading to the formation of electron traps $Ag^0$, then to the stabilization of aggregates of $Ag_m^{x+}$ (m: number of atoms, m<20; x: degree of ionization). In the examples the nanostructures are obtained by using a femtosecond laser emitting in the infrared for irradiances below the modification threshold of the refraction index. The elevated repetition rate of the laser causes, by cumulative effect, an elevation of local temperature and the diffusion of ions and of atoms, therefore leading to the formation of luminescent aggregates in the periphery of the zone of laser material interaction (in the examples: excitation at 405 nm; emission at 490 nm). The structures present a variation of the refraction index on the order of $1-5·10^{-3}$ relative to the surrounding glass. The visualization of the structures is facilitated by luminescent microscopy or by non-linear optical imagery.

Figure 4:
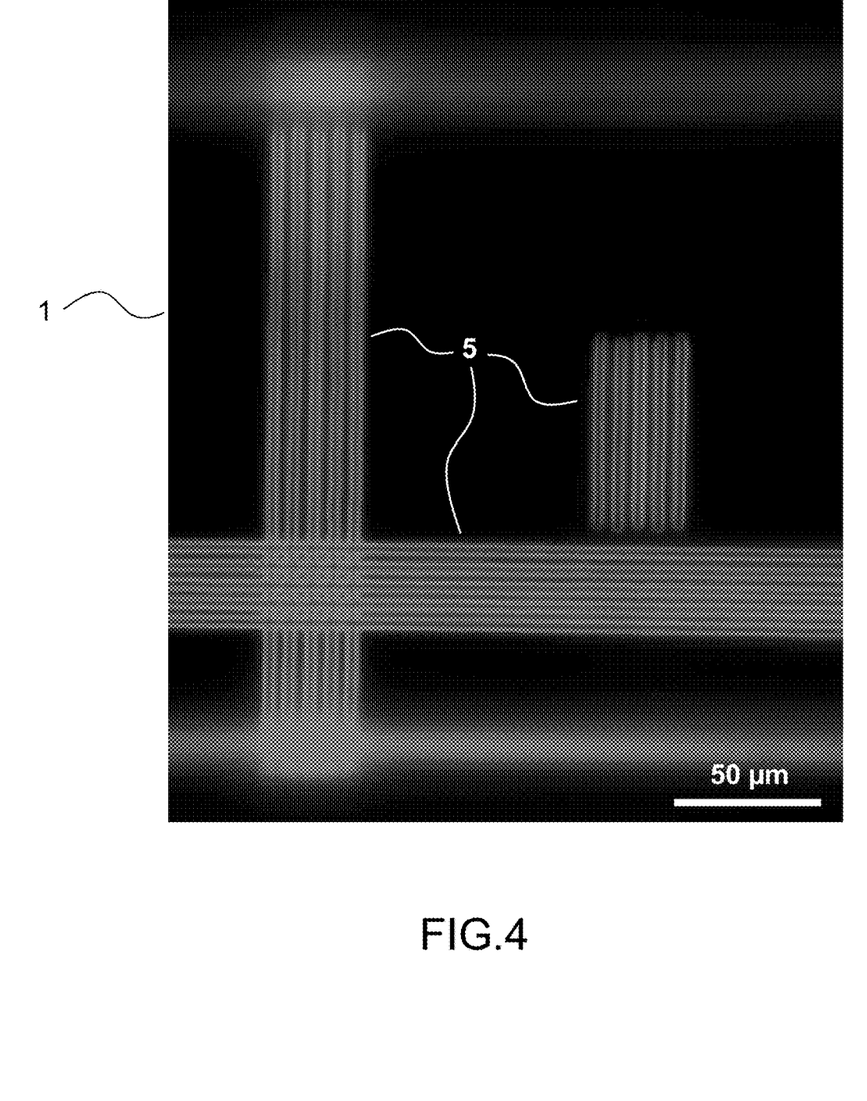
FIG. 4 shows an image of a top view under UV irradiation of photo-written zones on an optical fiber made of a photosensitive glass with a rectangular cross section according to an embodiment.

An example of laser inscription on ribbon optical fibers 1 of the present description such as illustrated in FIG. 4 was carried out at a depth of 50 micrometers and below the surface of the ribbon optical fiber 1 with the regenerative laser amplifier Ti:Sa (Coherent RegA 9000 up to 1 W, 250 kHz, 60 fs at 800 nm). Varied patterns 5 such as series of parallel or perpendicular lines were therefore written on the ribbon optical fiber 1. It is also possible to inscribe curved patterns or tubes of various sizes. In this example the duration of the irradiation and the transmitted lighting were controlled by an acousto-optical modulator allowing the accumulation of $N=10^5$ to $10^6$ with energies of 50 to 150 nJ. The positioning and the displacement of the sample are carried out with a highly precise 3D translation plate (plate XMS-50 stages, Micro-Controle). In this example the irradiations are made by focalization of the laser impulses with a microscope objective (Mitutoyo, APO PLAN VIS, 50 X NA0.55). In this example the duration of the impulse (FHWM) at the focal point of the sample is 145 fs (Gaussian bundle) and 200 fs (structured bundle).

Micro-Transmission

Figure 5:
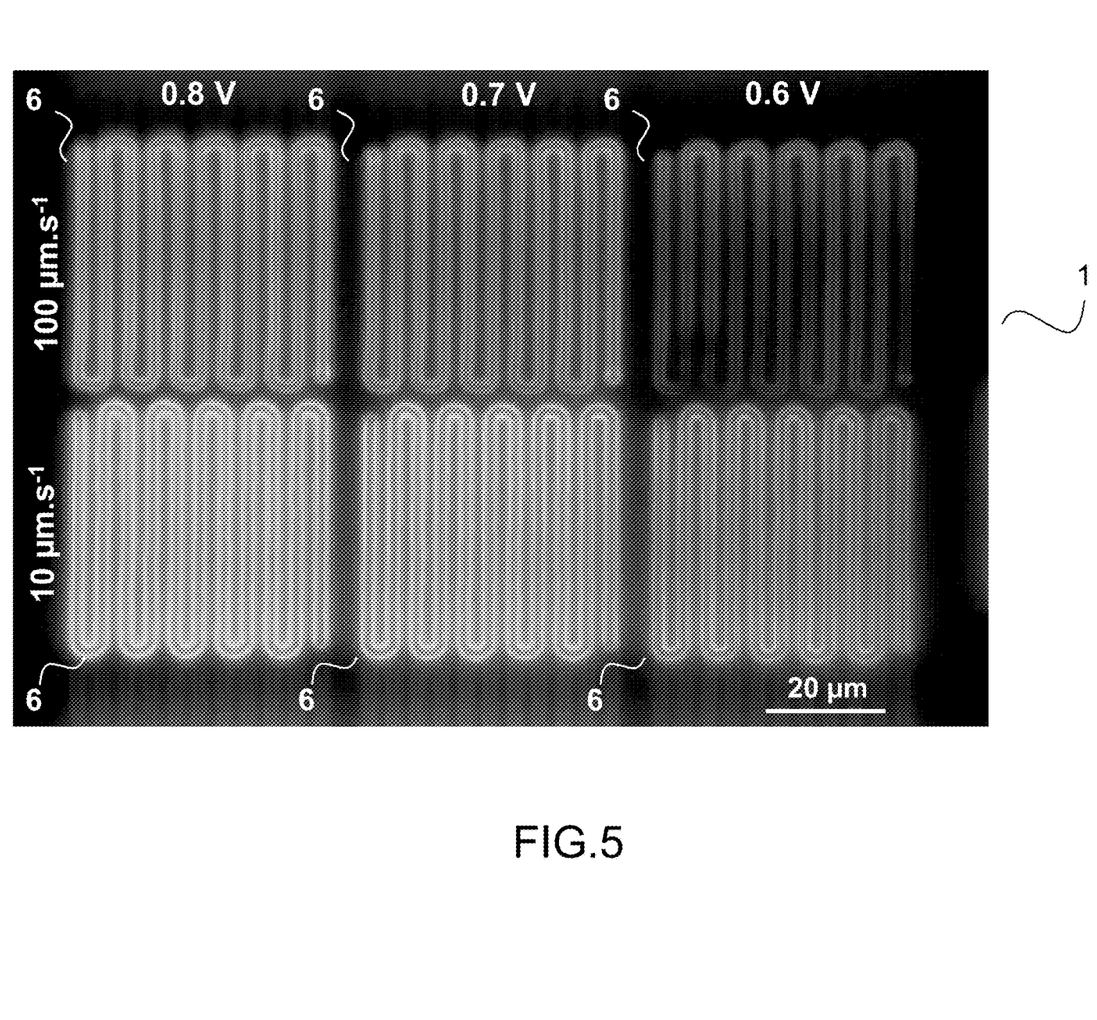
FIG. 5 shows an image of a top view under UV irradiation of photo-written zones on an optical fiber made of a photosensitive glass with a rectangular cross section according to an embodiment.
Figure 6:
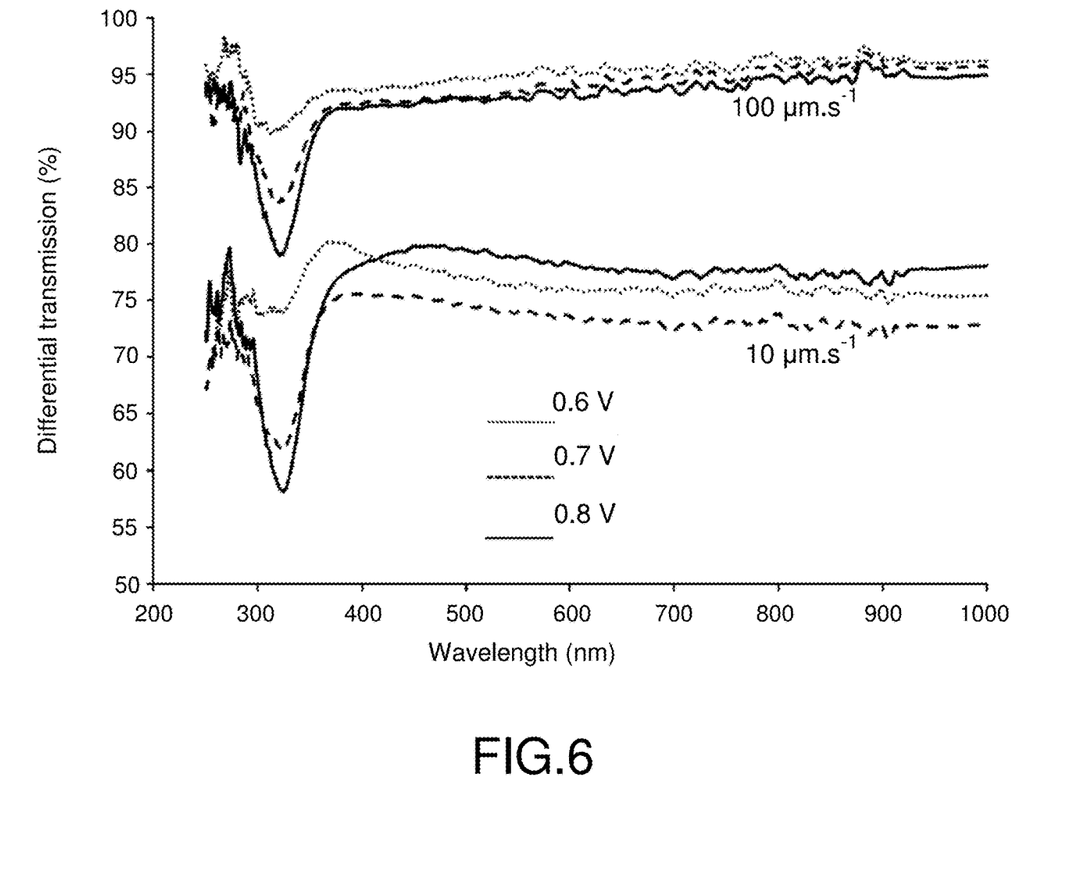
FIG. 6 shows measures of micro-transmission on the optical fiber made of a photosensitive glass with a rectangular cross section of FIG. 5.

FIG. 5 shows an image of a top view under UV irradiation of zones photo-written on a ribbon optical fiber 1 made of a photosensitive glass according to an embodiment. In this example six curved patterns 6 were made as a function of three different electrical voltages (V=0.6, 0.7 and 0.8 V) and two different laser speeds (v=10 $\mu m·s^{-1}$ and 100 $\mu m·s^{-1}$. As the cumulative doses deposited increase, the concentration of the aggregates induced by laser and the resulting emissions of luminescence also increase. The measurements of micro-transmission on the ribbon optical fiber 1 of FIG. 5 are illustrated in FIG. 6. The measurements were performed on the six curved patterns 6 structured as a function of the irradiation dose. The micro-transmission spectra of the examples of FIG. 6 show two absorption bands at $\lambda=287$ nm and $\lambda=340$ nm, whose intensity increases as a function of the deposited dose. The bands were attributed to aggregates of $Ag_m^{x+}$ and are in good agreement with the prior observations made on the phosphate-zinc glasses doped with silver. As is shown in this example, the structuration by laser inscription of ribbon optical fibers 1 of the present description presents an original method for the implementation in a complex manner of architectures which can be manipulated by light. In order to illustrate such a potential, several additional architectures (not shown) were realized such as optical resonators in the form of micro-rings written directly on the ribbon optical fibers 1 or interferometers of Mach-Zehnder. The laser inscription advantageously allows the integration of a plurality of elements on a single ribbon optical fiber 1, especially due to the thermal and optical stability of the aggregates photo-induced into the ribbon optical fiber 1. The possible applications comprise in particular spectroscopy with improved cavity and in-fiber tunable photonic.

Dosimetry

The ribbon optical fibers 1 of the present description can also be used in dosimetry. For example, the doping ions such as silver ions can play the part of a trap allowing the detection of incident energetic particles (electrons, gamma rays, protons, etc.). The optically stimulated radio-luminescence was demonstrated in the fibers made of silver fluorophosphates, wherein the optical signal emitted was directly proportional to the dose received. The ribbon optical fibers 1 of the present invention advantageously give access to architectures benefiting fully from the fiber geometry, the fiber serving both as a platform allowing at the same time the detection of any energetic particle and the moved guiding of optical impulses. The ribbon optical fibers 1 of the present description also allow the manufacture of opto-scintillating, dosimetric fibers, offering multiple benefits in terms of weight, flexibility, portability and response time (reading in real time), qualities important for applications in areas which are heavily contaminated or difficult to access. Moreover, compared to the semiconductor industry, the "fiber" technology is relatively simple and inexpensive. It is therefore possible to rapidly replace at lower cost detectors damaged by overexposure or mechanical chocks. Finally, the elaboration of 2D grills of interconnected, dosimetric fibers starting from ribbon optical fibers 1 of the present description provides an original solution available for the manufacture of wide, light and flexible detectors.

Multi-Material Fibers

Figure 7:
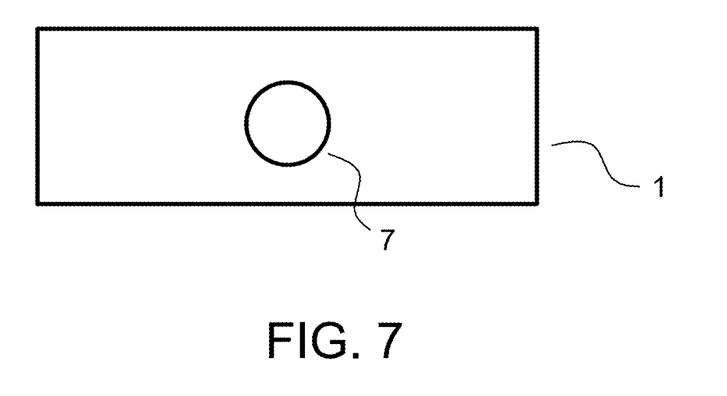
FIG. 7 schematically shows a sectional view of an optical fiber made of a photosensitive glass with a rectangular cross section according to an embodiment in which the rectangular cross section forms a cladding comprising a core.
Figure 8:
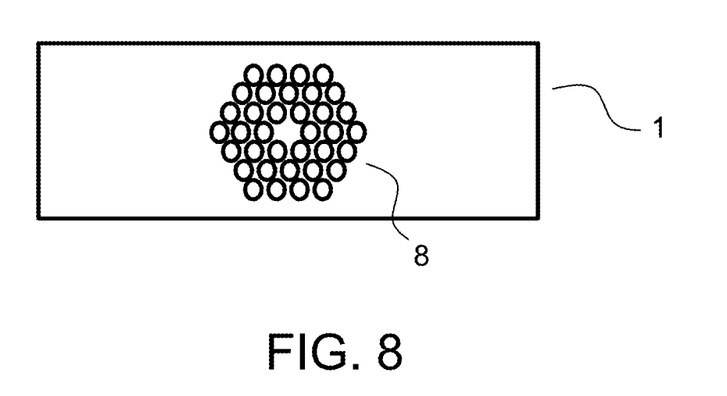
FIG. 8 schematically shows a sectional view of an optical fiber made of a photosensitive glass with a rectangular cross section according to an embodiment in which the rectangular cross section forms a cladding comprising a plurality of holes.

The ribbon optical fibers 1 of the present description can also comprise an assemblage of a plurality of different glasses. In fact, the association of a range of glasses with different properties furnishes access to new applications (e.g., improving the surface effects, laser gain or the non-linear optical response of the system, etc.). For example, architectures of core-cladding fibers comprising one or more vitreous cores and/or an organized assemblage of cylindrical holes surrounded by a cladding with a rectangular cross section can be manufactured. By way of example, FIGS. 7 and 8 schematically illustrate ribbon optical fibers 1 comprising at least one core (FIG. 7) and an organized assemblage of holes (FIG. 8) respectively.

Bragg Gratings

The ribbon optical fibers 1 of the present description can also be used for generating Bragg gratings. A Bragg network consists of a periodic modulation of the refraction index of the material constituting the fiber, which modulation induces under certain wavelength conditions the total reflection of the luminous waves traversing the medium. The Bragg gratings are formed by exposure to a periodic pattern of UV light created by a phase mask or by laser inscription. According to an embodiment, the increasing of the sensitivity of a UV light system can be brought about by the diffusion of hydrogen ($H_2$) or of deuterium (D) in the optical fiber (extrinsic, photosensitive fibers). Alternatively, the optical fiber can be doped during the manufacture of the preform 2. The ribbon optical fiber 1 doped in this manner can serve to create optical devices based on Bragg gratings. Compared to extrinsic, photosensitive fibers, the intrinsic fibers are preferred because they allow gratings to be engraved solely in the fiber core as well as with shorter UV exposure times while reducing any problems associated with the charging of hydrogen. The principal usages of Bragg gratings reside in systems of optical telecommunication (filters selectively and wavelength, multiplexers, demultiplexers) and the mirrors forming the optical cavities of fiber lasers or of the narrow-band sensors. The Bragg gratings also serve to stabilize a diode laser in frequency and to manufacture fiber sensors (detection of chemical products, measuring of mechanical stress, vibrations, acceleration or of temperature).

Although it was described with a certain number of detailed exemplary embodiments, the ribbon optical fiber 1 and the process for manufacturing a ribbon optical fiber 1 described in the present application comprise different variants, modifications and perfections which will appear in an evident manner to a person skilled in the art, wherein it is understood that the different variants, modifications and perfections form part of the scope of the present description such as defined by the following claims.

The invention claimed is:

1. An optical fiber made of a photosensitive glass comprising a rectangular cross section, wherein the radius of curvature of an angle of the rectangular cross section is less than 100 micrometers.

2. The optical fiber according to claim 1, wherein the radius of curvature of an angle of the rectangular cross section is less than one fourth of the average width of the rectangular cross section and/or than one half of the average thickness of the rectangular cross section.

3. The optical fiber according to claim 1, wherein the photosensitive glass is photosensitive and photo-writable.

4. The optical fiber according to claim 1, wherein the photosensitive glass is selected from the group constituted by glasses made of phosphates, telluriums, chalcogenides, borates and silicas.

5. The optical fiber according to claim 1, wherein the photosensitive glass is a glass made of phosphates.

6. The optical fiber according to claim 1, wherein the photosensitive glass is a glass doped with silver.

7. The optical fiber according to claim 1, wherein the rectangular cross section forms a cladding comprising at least one core and/or an organized assembly of holes.

8. The optical fiber according to claim 1, wherein the rectangular cross section has an average width comprised between 100 and 400 micrometers and an average thickness comprised between 50 and 200 micrometers.

9. An optical device comprising an optical fiber according to claim 1.

10. A method for manufacturing an optical fiber made of a photosensitive glass with a rectangular cross section, the method comprising:
   providing a preform made of a photosensitive glass with a rectangular cross-section; and
   homothetic drawing of the preform.

11. The manufacturing method according to claim 10, wherein the homothetic drawing of the preform comprises heating of the preform and placing of the heated preform under mechanical tension.

12. The manufacturing method according to claim 11, wherein the heating temperature of the preform is comprised between 500 and 800° C.

13. The manufacturing method according to claim 11, wherein a descent rate of the preform is comprised between 0.3 mm/min and 0.7 mm/min.

14. The manufacturing method according to claim 10, wherein the tension of the heated preform is comprised between $2 \cdot 10^{-2}$ and $40 \cdot 10^2$ newtons.

15. The manufacturing method according to claim 10, further comprising: polishing of the preform and homothetic drawing of the polished preform.

16. The manufacturing method according to claim 10, further comprising: piercing at least one hole in the preform; and inserting a cylinder or a vitreous tube into the at least one hole pierced in the preform.

17. The manufacturing method of claim 10, wherein the optical fiber is used in at least one of: photo-writing, dosimetry, photonics, generation of Bragg gratings and in linear and/or non-linear optics.

* * * * *